United States Patent
Dixon et al.

(10) Patent No.: US 9,148,380 B2
(45) Date of Patent: Sep. 29, 2015

(54) SYSTEM AND METHOD FOR PROVIDING A SEQUENCE NUMBERING MECHANISM IN A NETWORK ENVIRONMENT

(75) Inventors: Walter Dixon, Fuquay Varina, NC (US); Mahesh C. Kalyanakrishnan, Cary, NC (US); Juan M. Mojica, Cary, NC (US); Humberto M. Taváres, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 633 days.

(21) Appl. No.: 12/624,010

(22) Filed: Nov. 23, 2009

(65) Prior Publication Data

US 2011/0122870 A1  May 26, 2011

(51) Int. Cl.
| | | |
|---|---|---|
| *H04L 12/851* | (2013.01) | |
| *H04L 12/813* | (2013.01) | |
| *H04L 12/833* | (2013.01) | |
| *H04L 12/801* | (2013.01) | |

(Continued)

(52) U.S. Cl.
CPC ............ *H04L 47/2441* (2013.01); *H04L 47/20* (2013.01); *H04L 47/2458* (2013.01); *H04L 47/34* (2013.01); *H04M 15/00* (2013.01); *H04M 15/41* (2013.01); *H04M 15/43* (2013.01); *H04M 15/62* (2013.01); *H04M 15/80* (2013.01); *H04M 15/8016* (2013.01); *H04M 15/8214* (2013.01); *H04W 4/24* (2013.01); *H04M 2215/0164* (2013.01); *H04M 2215/74* (2013.01); *H04M 2215/7414* (2013.01); *H04M 2215/782* (2013.01); *H04W 28/10* (2013.01)

(58) Field of Classification Search
None
See application file for complete search history.

(56) References Cited

U.S. PATENT DOCUMENTS

| | | | | |
|---|---|---|---|---|
| 5,151,899 A | * | 9/1992 | Thomas et al. | ............... 370/394 |
| 5,371,731 A | * | 12/1994 | Pratt et al. | ..................... 370/216 |

(Continued)

FOREIGN PATENT DOCUMENTS

| | | |
|---|---|---|
| EP | 1250022 | 10/2002 |
| EP | 1619917 | 1/2006 |

(Continued)

OTHER PUBLICATIONS

"3GPP TS 23.203 V9.2.0 (Sep. 2009) Technical Specification 3rd Generation Partnership Project; Technical Specification Group Services and System Aspects; Policy and Charging Control Architecture (Release 9)," 3GPP TS 23.203 V9.2.0. vol. 23, 203, No. V9.2.0; Sep. 1, 2009 120 pages.*

(Continued)

*Primary Examiner* — John Blanton
*Assistant Examiner* — Thinh Tran
(74) *Attorney, Agent, or Firm* — Patent Capital Group

(57) ABSTRACT

A method is provided in one example and includes receiving a plurality of packets associated with a flow; parsing the plurality of packets associated with the flow; executing a first quality of service decision such that a first set of packets within the plurality of packets are not forwarded to their intended destination; receiving a second set of packets, which reflects a retransmission of at least a portion of the first set of packets; executing a second quality of service decision such that the second set of packets is forwarded to their intended destination; and billing the second set of packets in response to forwarding the second set of packets. In more detailed embodiments, the method includes accessing a table in which entries are provided for particular sequence number ranges for the first set of packets.

14 Claims, 3 Drawing Sheets

(51) Int. Cl.
*H04M 15/00* (2006.01)
*H04W 4/24* (2009.01)
*H04W 28/10* (2009.01)

(56) References Cited

U.S. PATENT DOCUMENTS

| | | | |
|---|---|---|---|
| 5,898,713 A | 4/1999 | Melzer et al. | |
| 6,496,516 B1 | 12/2002 | Dabecki et al. | |
| 6,522,880 B1 | 2/2003 | Verma et al. | |
| 6,643,621 B1 | 11/2003 | Dodrill et al. | |
| 6,654,792 B1 | 11/2003 | Verma et al. | |
| 6,684,256 B1 | 1/2004 | Warrier et al. | |
| 6,728,266 B1 | 4/2004 | Sabry et al. | |
| 6,829,242 B2 | 12/2004 | Davison et al. | |
| 6,839,767 B1 | 1/2005 | Davies et al. | |
| 6,862,624 B2 | 3/2005 | Colby et al. | |
| 6,917,592 B1 | 7/2005 | Ramankutty et al. | |
| 6,922,411 B1 | 7/2005 | Taylor | |
| 6,968,389 B1 | 11/2005 | Menditto et al. | |
| 7,317,693 B1 | 1/2008 | Roesch et al. | |
| 7,366,189 B2 | 4/2008 | Davison et al. | |
| 7,426,202 B2 | 9/2008 | Warrier et al. | |
| 7,447,765 B2 | 11/2008 | Aerrabotu et al. | |
| 7,496,662 B1 | 2/2009 | Roesch et al. | |
| 7,502,836 B1 | 3/2009 | Menditto et al. | |
| 7,522,521 B2 | 4/2009 | Bettink et al. | |
| 7,610,330 B1 | 10/2009 | Quinn et al. | |
| 7,673,072 B2 | 3/2010 | Boucher et al. | |
| 7,742,399 B2 | 6/2010 | Pun | |
| 7,768,983 B2 | 8/2010 | Nylander et al. | |
| 7,792,113 B1 | 9/2010 | Foschiano et al. | |
| 7,808,919 B2 | 10/2010 | Nadeau et al. | |
| 7,827,256 B2 | 11/2010 | Phillips et al. | |
| 7,856,512 B2 | 12/2010 | Hilla et al. | |
| 7,885,248 B2 | 2/2011 | Harper et al. | |
| 7,885,260 B2 | 2/2011 | Paul et al. | |
| 7,890,636 B2 | 2/2011 | Grayson et al. | |
| 7,925,709 B1 | 4/2011 | Ben-Yoseph et al. | |
| 7,926,071 B2 | 4/2011 | Stephens et al. | |
| 7,929,442 B2 | 4/2011 | Connor et al. | |
| 7,990,993 B1 | 8/2011 | Ghosh et al. | |
| 8,018,866 B1 | 9/2011 | Kasturi et al. | |
| 8,086,253 B1 | 12/2011 | Kalmkar et al. | |
| 8,279,776 B1 | 10/2012 | Everson et al. | |
| 8,339,959 B1 | 12/2012 | Moisand et al. | |
| 2002/0046264 A1 | 4/2002 | Dillon et al. | |
| 2002/0053029 A1 | 5/2002 | Nakamura et al. | |
| 2003/0028433 A1 | 2/2003 | Merriman et al. | |
| 2003/0028644 A1 | 2/2003 | Maguire et al. | |
| 2003/0039237 A1 | 2/2003 | Forslow | |
| 2003/0058872 A1 | 3/2003 | Berggreen et al. | |
| 2003/0097481 A1 | 5/2003 | Richter | |
| 2004/0054925 A1 | 3/2004 | Etheridge et al. | |
| 2004/0088385 A1 | 5/2004 | Blanchet et al. | |
| 2004/0224678 A1 | 11/2004 | Dahod et al. | |
| 2004/0236855 A1 | 11/2004 | Peles | |
| 2005/0013253 A1 | 1/2005 | Lindskog et al. | |
| 2005/0025152 A1 | 2/2005 | Georgiou et al. | |
| 2005/0058153 A1 | 3/2005 | Santhoff et al. | |
| 2005/0074005 A1 | 4/2005 | Okuno | |
| 2005/0088974 A1 | 4/2005 | Savoor et al. | |
| 2005/0091371 A1 | 4/2005 | Delegue et al. | |
| 2005/0096016 A1 | 5/2005 | Tervo et al. | |
| 2005/0120091 A1 | 6/2005 | Casais et al. | |
| 2005/0147069 A1 | 7/2005 | Rink et al. | |
| 2005/0239473 A1 | 10/2005 | Pan et al. | |
| 2005/0246346 A1 | 11/2005 | Gerdes et al. | |
| 2005/0286504 A1 | 12/2005 | Kwon | |
| 2006/0018328 A1 | 1/2006 | Mody et al. | |
| 2006/0029084 A1 | 2/2006 | Grayson | |
| 2006/0034303 A1* | 2/2006 | Ikonen et al. | 370/401 |
| 2006/0058021 A1 | 3/2006 | Fox et al. | |
| 2006/0098573 A1 | 5/2006 | Beer et al. | |
| 2006/0164992 A1* | 7/2006 | Brown et al. | 370/235 |
| 2006/0222086 A1 | 10/2006 | Frye | |
| 2006/0224750 A1 | 10/2006 | Davies et al. | |
| 2006/0234678 A1 | 10/2006 | Juitt et al. | |
| 2006/0256722 A1* | 11/2006 | Taha et al. | 370/235 |
| 2006/0268901 A1 | 11/2006 | Choyi et al. | |
| 2006/0291388 A1 | 12/2006 | Amdahl et al. | |
| 2007/0014245 A1 | 1/2007 | Aloni et al. | |
| 2007/0027992 A1 | 2/2007 | Judge et al. | |
| 2007/0067839 A1 | 3/2007 | Hamada et al. | |
| 2007/0078955 A1 | 4/2007 | Siliquini et al. | |
| 2007/0097983 A1 | 5/2007 | Nylander et al. | |
| 2007/0101421 A1 | 5/2007 | Wesinger et al. | |
| 2007/0105568 A1 | 5/2007 | Nylander et al. | |
| 2007/0116019 A1 | 5/2007 | Cheever et al. | |
| 2007/0116020 A1 | 5/2007 | Cheever et al. | |
| 2007/0201369 A1 | 8/2007 | Pedersen et al. | |
| 2007/0201383 A1 | 8/2007 | Ong et al. | |
| 2007/0208820 A1 | 9/2007 | Makhervaks et al. | |
| 2007/0243872 A1 | 10/2007 | Gallagher et al. | |
| 2007/0253328 A1 | 11/2007 | Harper et al. | |
| 2007/0271453 A1 | 11/2007 | Pohja et al. | |
| 2007/0298848 A1 | 12/2007 | Babin | |
| 2008/0010354 A1 | 1/2008 | Sasaki et al. | |
| 2008/0025261 A1 | 1/2008 | Riley | |
| 2008/0026740 A1 | 1/2008 | Netanel | |
| 2008/0045267 A1 | 2/2008 | Hind et al. | |
| 2008/0114862 A1 | 5/2008 | Moghaddam et al. | |
| 2008/0133518 A1 | 6/2008 | Kapoor et al. | |
| 2008/0137541 A1 | 6/2008 | Agarwal et al. | |
| 2008/0147837 A1 | 6/2008 | Klein et al. | |
| 2008/0162637 A1 | 7/2008 | Adamczyk et al. | |
| 2008/0176582 A1 | 7/2008 | Ghai et al. | |
| 2008/0177880 A1 | 7/2008 | Ginis | |
| 2008/0188223 A1 | 8/2008 | Vesterinen et al. | |
| 2008/0298309 A1 | 12/2008 | Dahod et al. | |
| 2008/0301254 A1 | 12/2008 | Bestler | |
| 2008/0310404 A1 | 12/2008 | Valme et al. | |
| 2008/0316980 A1 | 12/2008 | Ahlen et al. | |
| 2009/0017864 A1 | 1/2009 | Keevill et al. | |
| 2009/0061821 A1 | 3/2009 | Chen et al. | |
| 2009/0061873 A1 | 3/2009 | Bao et al. | |
| 2009/0067417 A1 | 3/2009 | Kalavade et al. | |
| 2009/0086742 A1 | 4/2009 | Ghai et al. | |
| 2009/0089447 A1 | 4/2009 | Balachandran et al. | |
| 2009/0092136 A1 | 4/2009 | Nazareth et al. | |
| 2009/0098872 A1 | 4/2009 | Deshpande et al. | |
| 2009/0109849 A1 | 4/2009 | Wood et al. | |
| 2009/0109982 A1 | 4/2009 | Batz et al. | |
| 2009/0129271 A1 | 5/2009 | Ramankutty et al. | |
| 2009/0156213 A1 | 6/2009 | Spinelli et al. | |
| 2009/0161680 A1* | 6/2009 | Ishikawa et al. | 370/400 |
| 2009/0164597 A1 | 6/2009 | Shuster | |
| 2009/0207759 A1 | 8/2009 | Andreasen et al. | |
| 2009/0215438 A1 | 8/2009 | Mittal et al. | |
| 2009/0254658 A1 | 10/2009 | Kamikura et al. | |
| 2009/0262682 A1 | 10/2009 | Khetawat et al. | |
| 2009/0268739 A1 | 10/2009 | Dunbar et al. | |
| 2009/0279522 A1 | 11/2009 | Leroy et al. | |
| 2009/0286510 A1 | 11/2009 | Huber et al. | |
| 2009/0307746 A1 | 12/2009 | Di et al. | |
| 2010/0010991 A1 | 1/2010 | Joshi | |
| 2010/0067462 A1 | 3/2010 | Beser et al. | |
| 2010/0077102 A1 | 3/2010 | Lim et al. | |
| 2010/0082787 A1 | 4/2010 | Kommula et al. | |
| 2010/0091653 A1 | 4/2010 | Koodli et al. | |
| 2010/0091775 A1 | 4/2010 | Yamamoto | |
| 2010/0103871 A1 | 4/2010 | Mooney et al. | |
| 2010/0124933 A1 | 5/2010 | Chowdhury et al. | |
| 2010/0131646 A1 | 5/2010 | Drako | |
| 2010/0174829 A1 | 7/2010 | Drako | |
| 2010/0186064 A1 | 7/2010 | Huang et al. | |
| 2010/0195640 A1 | 8/2010 | Park et al. | |
| 2010/0278070 A1 | 11/2010 | Melia et al. | |
| 2010/0291897 A1 | 11/2010 | Ghai et al. | |
| 2011/0021192 A1 | 1/2011 | Grayson et al. | |
| 2011/0021196 A1 | 1/2011 | Grayson et al. | |
| 2011/0058479 A1 | 3/2011 | Chowdhury et al. | |
| 2011/0063976 A1 | 3/2011 | Birk et al. | |
| 2011/0069663 A1 | 3/2011 | Shu et al. | |
| 2011/0075557 A1 | 3/2011 | Chowdhury et al. | |

(56) References Cited

U.S. PATENT DOCUMENTS

| | | |
|---|---|---|
| 2011/0075675 A1 | 3/2011 | Koodli et al. |
| 2011/0076985 A1 | 3/2011 | Chami et al. |
| 2011/0145103 A1 | 6/2011 | Ljunggren et al. |
| 2011/0145111 A1 | 6/2011 | Ljundren et al. |
| 2011/0182249 A1 | 7/2011 | Yang et al. |
| 2011/0185049 A1 | 7/2011 | Atreya et al. |
| 2011/0225284 A1 | 9/2011 | Savolainen |
| 2011/0235546 A1 | 9/2011 | Horn et al. |
| 2011/0235595 A1 | 9/2011 | Mehta et al. |
| 2011/0295942 A1 | 12/2011 | Raghunath et al. |
| 2012/0002543 A1 | 1/2012 | Dighe et al. |
| 2012/0076120 A1 | 3/2012 | Kovvali et al. |
| 2012/0082073 A1 | 4/2012 | Andreasen et al. |
| 2012/0082093 A1 | 4/2012 | Andreasen et al. |
| 2012/0082094 A1 | 4/2012 | Andreasen et al. |
| 2012/0082132 A1 | 4/2012 | Andreasen et al. |
| 2012/0082146 A1 | 4/2012 | Andreasen et al. |
| 2012/0082161 A1 | 4/2012 | Leung et al. |
| 2012/0184258 A1 | 7/2012 | Kovvali et al. |
| 2012/0224536 A1 | 9/2012 | Hahn et al. |
| 2013/0003741 A1 | 1/2013 | Singh et al. |
| 2013/0041934 A1 | 2/2013 | Annamalaisami et al. |
| 2013/0058274 A1 | 3/2013 | Scherzer et al. |
| 2013/0258963 A1 | 10/2013 | Mihaly et al. |

FOREIGN PATENT DOCUMENTS

| | | |
|---|---|---|
| EP | 1978685 | 10/2008 |
| WO | WO 92/07438 | 4/1992 |
| WO | WO 92/14327 | 8/1992 |
| WO | WO2005/015825 | 2/2005 |
| WO | WO 2009/089455 | 7/2009 |
| WO | WO2009/132700 | 11/2009 |
| WO | WO2011/062745 | 5/2011 |
| WO | WO2011/062746 | 5/2011 |

OTHER PUBLICATIONS

U.S. Appl. No. 12/642,790, filed Dec. 19, 2009, entitled "System and Method for Managing Out of Order Packets in a Network Environment," Inventor(s): Walter Dixon et al.
U.S. Appl. No. 12/642,791, filed Dec. 19, 2009, entitled "System and Method for Providing Subscriber Aware Routing in a Network Environment," Inventor(s): Shmuel Shaffer.
PCT Notification of Transmittal (1 page) of the International Search Report (4 pages) and the Written Opinion of the International Searching Authority, or the Declaration (6 pages) mailed Mar. 1, 2011 for PCT/US2010/054834.
Cisco Systems, Inc., "Cisco NAC Applicance—Clean Access Server Installation and Configuration Guide, Rel. 4.6 (1)," Jul. 2009, 3 pages http://www.cisco.com/en/US/docs/security/nac/appliance/configuration_guide/461/cas/cas46lug.pdf.
Cisco Systems, Inc., "Cisco NAC Applicance—Clean Access Server Installation and Configuration Guide," Jul. 2009, 5 pages http://www.cisco.com/en/US/docs/security/nac/appliance/configuration_guide/461/cam/cam46lug.pdf.
"3rd Generation Partnership Project; Technical Specification Group Core Network and Terminals; Policy and Charging over Gx reference point (Release 9)," 3GPP Standard; 3GPP T5 29.212, 3rd Generational Partnership Project (3GPP), Mobile Competence Centre; 650, Route Des Lucioles; F-06921 Sophia-Antipolis Cedex; France, No. V9.0.0, Sep. 1, 2009; 92 pages.
PCT Notification of Transmittal (1 page) of the International Search Report (4 pages) and the Written Opinion of the International Searching Authority, or the Declaration (7 pages) mailed Feb. 8, 2011 for PCT/US2010/054838.
"3GPP TS 23.203 V9.2.0 (Sep. 2009) Technical Specification 3rd Generation Partnership project; Technical Specification Group Services and System Aspects; Policy and Charging Control Architecture (Release 9)," 3GPP TS 23.203 V9.2.0, vol. 23, 203, No. V9.2.0; Sep. 1, 2009, 120 pages URL:ftp://ftp.3.gpp.org/specs/archive/23_series/23.203/.

U.S. Appl. No. 12/621,066, filed Nov. 18, 2009, entitled "System and Method for Reporting Packet Characteristics in a Network Environment," Inventor(s): Robert Batz et al.
U.S. Appl. No. 12/621,114, filed Nov. 18, 2009, entitled "System and Method for Inspecting Domain Name System Flows in a Network Environment," Inventor(s): Robert Batz et al.
Cisco Systems, Inc., Configuring URL Routing (L5 Routing) on the CSS 11000 and 11500, © 1992-2006; Document ID: 25999; 5 pages http://www.cisco.com/en/US/products/hw/contnetw/ps792/products_configuration_example09186a00801c0dbc.shtml.
Cisco Systems, Inc., "Cisco Application-Oriented Networking," © 1992-2006; 10 pages http://www.cisco.com/en/US/prod/collateral/modules/ps6438/product_data_sheet0900aecd802c1f9c.html.
EPO Aug. 22, 2012 Response to Communication re Rules 161(1) and 162 EPC from European Application No. 10779130; 8 pages.
U.S. Appl. No. 13/159,906, filed Jun. 14, 2011, entitled "Selective Packet Sequence Acceleration in a Network Environment," Inventor(s): Bhagatram Janarthanan et al.
U.S. Appl. No. 13/160,189, filed Jun. 14, 2011, entitled "Preserving Sequencing During Selective Packet Acceleration in a Network Environment," Inventor(s): Bhagatram Janarthanan et al.
U.S. Appl. No. 13/160,426, filed Jun. 14, 2011, entitled "Selective Packet Sequence Acceleration in a Network Environment," Inventor(s): Bhagatram Janarthanan.
3GPP TS.23.203 v.11.3.0 Technical Specification—"3rd Generation Partnership Project; Technical Specification Group Services and System Aspects; Policy and Charging control architecture (Release 11)," Sep. 2011; 167 pages.
3GPP TS.23.401 v.10.5.0 Technical Specification—"3rd General Partnership Project; Technical Specification Group Services and System Aspects: General Packet Radio Service (GPRS) enhancements for Evolved Universal Terrestrial Radio Access Network (E-UTRAN) access (Release 10)," Sep. 2011, 284 pages.
3GPP TS 23.236 v.10.0.0 Technical Specification—"3rd General Partnership Project; Technical Specification Group Services and Systems Aspects; Intra-Domain Connection of Radio Access Network (RAN) Nodes to Multiple Cor Network (CN) Nodes (Release 10)," Mar. 2010, 39 pages.
Chowdhury, K. "Fast Handoff Support for HRPD," 3rd Generation Partnership Project 2, 3GPP2, Apr. 24, 2006.
Chowdhury, K. "Network-Based Layer 3 Connectivity and Mobility Management for IPv6," draft-chowdbury-netmip6-01.txt, Network Working Group Internet Draft, Sep. 8, 2006, 20 pages; http://tools.ietf.org/html/draft-chowdhury-netmip6-01.
Chowdhury, K., "Network Based L3 Connectivity and Mobility Management for IPv4," draft-chowdbury-netmip4-001.tt, Feb. 25, 2006; 16 pages http://tools.ietf.org/html/draft-chowdhury-netmip4-00.
Devarapalli, V., et al., "Proxy Mobile IPv6 and Mobil IPv6 Interworking," draft-devarapalli-netlmm-pmipv6-mipv6-00.txt, NETLMM Working Group Internet Draft, Apr. 10, 2007; 9 pages http://tools,ietf.org/html/draft-devarapalli-netlmm-pmipv6-mipv6-00.
Lior, A. et al., "Mobile IP Key Derivation using EAP," draft-lior-mipkeys-eap-00, Network Working Group, Feb. 25, 2006; 17 pages; http://tools.ietf.org/html/draft-lior-mipkeys-eap-00.
Navali, J., et al., "IPv6 over Network based Mobile IPv4," draft-navali-ip6-over-netmip4-00.txt, Network Working Group, Feb. 25, 2006; 20 pages http://tools.ietf.org/html/draft-navali-ip6-over-netmip4-00.
Ericsson, Tdoc S2-000888; "SGSN decomposition," Document for discussion; R000 Architecture; 3GPP TSG SA2 Meeting #13; Berlin, May 22-26, 2000, 13 pages; http://www.3gpp.org/ftp/tsg_sa/WG2_Arch/TSGS2_13/tdocs/52-000888.zip.
3GPP TS 23.261 v.10.1.0 Technical Specification—3GPP Organizational Partners, 3rd Generation Partnership Project; Technical Specification Group Services and System Aspects; IP flow mobility and seamless Wireless Local Area Network (WLAN) offload; Stage 2 (Release 10); © 2010, 22 pages; http://www.3gpp.org.
3GPP TR 23.829 v.10.0—3GPP Organizational Partners, 3rd Generation Partnership Project; Technical Specification Group Services and System Aspects; Local IP Access and Selected IP Traffic Offload

(56) References Cited

OTHER PUBLICATIONS (LIPA-SIPTO) (Release 10); 3GPP TR 23.829 V10.0.0 (Mar. 2011) © 2011, 43 pages; http://www.3gpp.org.
User Agent Profile (UAProf) Specification, Wireless Application Group, Wireless Application Protocol Forum, Version 10, Nov. 1999, 76 pages.
U.S. Appl. No. 12/984,034, filed Jan. 4, 2011, entitled "System and Method for Exchanging Information in a Mobile Wireless Network Environment," Inventors: Gary B. Mahaffey, et al.
U.S. Appl. No. 13/160,344, filed Jun. 14, 2011, entitled "Accelerated Processing of Aggregate Data Flows in a Network Environment," Inventor(s): Imnaz Meher Jilani et al.
PCT May 31, 2012 International Preliminary Report on Patentability and Written Opinion of the International Searching Authority (8 pages) for PCT/US2010/054834.
PCT May 30, 2012 International Preliminary Report on Patentability and Written Opinion of the International Searching Authority (8 pages) for PCT/US2010/054838.
U.S. Appl. No. 14/260,387, filed Apr. 24, 2014, entitled "System and Method for Managing Out of Order Packets in a Network Environment," Inventor(s): Walter Dixon et al.
U.S. Appl. No. 14/257,098, filed Apr. 21, 2014, entitled "Accelerated Processing of Aggregate Data Flows in a Network Environment," Inventor(s): Imnaz Meher Jilani et al.
U.S. Appl. No. 14/257,131, filed Apr. 21, 2014, entitled "Selective Packet Sequence Acceleration in a Network Environment," Inventor(s): Bhagatram Janarthanan.
EPO Oct. 1, 2013 Communication from European Application Serial No. 10779129.5.
"Stoke Mobile Data Offload Solution Brief," © 2009 Stoke, Inc.; Aug. 2009, 4 pages; [Retrieved and printed Nov. 14, 2013] stoke.com/GetFile.asp?f=a08fed265abc46434edf6763307c1078.
3GPP TR 25.820 v8.0.0 (Mar. 2008), 3rd Generation Partnership Project; Technical Specification Group Radio Access Networks; 3G Home NodeB Study Item Technical Report (Release 8); http://www.3gpp.org, 2008. 37 pages.
3GPP TR 29.814 v7.1.0 (Jun. 2007), 3rd Generation Partnership Project; Technical Specification Group Core Networks and Terminals Feasibility Study on Bandwidth Savings at Nb Interface with IP transport (Release 7), Global System for Mobile Communications, http://www.3gpp.org, 2007. 19 pages.
3GPP TS 22.011 v8.4.1 (Jun. 2008), 3rd Generation Partnership Project; Technical Specification Group Services and System Aspects; Service accessibility (Release 8), Global System for Mobile Communications, http://www/3gpp.org, 2008. 25 pages.
3GPP TS 23.060 v8.1.0 (Jun. 2008), 3rd Generation Partnership Project; Technical Specification Group Services and System Aspects; General Packet Radio Service (GPRS); Service description; Stage 2 (Release 8), Global System for Mobile Communications, http://www.3gpp.org, 2008. 259 pages.
3GPP TS 23.107 v7.1.0 (Sep. 2007), 3rd Generation Partnership Project; Technical Specification Group Services and System Aspects; Quality of Service (QoS) concept and architecture (Release 7), http://www.3gpp.org, 2007. 40 pages.
3GPP TS 23.228 v8.5.0 (Jun. 2008), 3rd Generation Partnership Project; Technical Specification Group Services and System Aspects; IP Multimedia Subsystem (IMS); Stage 2 (Release 8), http://www.3gpp.org, 2008. 240 pages.
3GPP TS 23.234 v7.7.0 (Jun. 2008), 3rd Generation Partnership Project; Technical Specification Group Services and System Aspects; 3GPP system to Wireless Local Area Network (WLAN) interworking; System description (Release 7), http://www.3gpp.org, 2008. 85 pages.
3GPP TS 23.236 v7.0.0 (Dec. 2006), 3rd Generation Partnership Project; Technical Specification Group Services and System Aspects; Intra-domain connection of Radio Access Network (RAN) nodes to multiple Core Network (CN) nodes (Release 7); Global System for Mobile Communications, http://www.3gpp.org, 2006. 37 pages.
3GPP TS 25.411 v7.1.0 (Sep. 2007); 3rd Generation Partnership Project; Technical Specification Group Radio Access Network; UTRAN Iu interface layer 1 (Release 7), http://www.3gpp.org, 2007. 9 pages.
3GPP TS 25.413 V7.8.0 (Dec. 2007), 3rd Generation Partnership Project; Technical Specification Group Radio Access Network; UTRAN Iu interface RANAP signaling (Release 7), http://www.3gpp.org, 2007. 359 pages.
3GPP TS 25.415 v7.3.0 (Dec. 2006), 3rd Generation Partnership Project; Technical Specification Group Radio Access Network; UTRAN Iu interface user plane protocols (Release 7), http://www.3gpp.org, 2006. 64 pages.
3GPP TS 29.163 v8.3.0 (May 2008), 3rd Generation Partnership Project; Technical Specification Group Core Network and Terminals; Interworking between the IP Multimedia (IM) Core Network (CN) subsystem and Circuit Switched (CS) networks (Release 8), Global System for Mobile Communications, http://www.3gpp.org, 2008. 237 pages.
3GPP TS 29.234 v7.9.0 (Jun. 2008), 3rd Generation Partnership Project; Technical Specification Group Core Network and Terminals; 3GPP system to Wireless Local Area Network (WLAN) interworking; Stage 3 (Release 7); http://www.3gpp.org, 2008. 92 pages.
3GPP TS 29.332 v8.2.0 (Jun. 2008), 3rd Generation Partnership Project; Technical Specification Group Core Network and Terminals; Media Gateway Control Function (MGCF)—IM Media Gateway; Mn Interface (Release 8), http://www.3gpp.org, 2008. 73 pages.
3GPP TS 29.414 v8.1.0 (May 2008), 3rd Generation Partnership Project; Technical Specification Group Core Network and Terminals; Core network Nb data transport and transport signalling (Release 8), Global System for Mobile Communications, http://www.3gpp.org, 2008. 29 pages.
3GPP TS 29.415 v8.0.0 (May 2008), 3rd Generation Partnership Project; Technical Specification Group Core Network and Terminals; Core Network Nb Interface User Plane Protocols (Release 8), Global System for Mobile Communications, http://www.3gpp.org, 2008. 14 pages.
PRC Apr. 3, 2014 SIPO First Office Action from Chinese Application No. 201080051408.1.
U.S. Appl. No. 14/658,633, filed Mar. 16, 2015, entitled "System and Method for Reporting Packet Characteristics in a Network Environment," Inventor(s): Robert Batz et al.
U.S. Appl. No. 14/633,572, filed Feb. 27, 2015, entitled "System and Method for Exchanging Information in a Mobile Wireless Network Environment," Inventors: Gary B. Mahaffey, et al.
U.S. Appl. No. 14/611,510, filed Feb. 2, 2015, entitled "Selective Packet Sequence Acceleration in a Network Environment," Inventor(s): Bhagatram Janarthanan et al.
U.S. Appl. No. 14/683,228, filed Apr. 10, 2015, entitled "System and Method for Offloading Data in a Communication System," Inventors: Flemming S. Andreasen, et al.
PRC Dec. 12, 2014 SIPO Second Office Action from Chinese Application No. 201080051408.1.

\* cited by examiner

SYSTEM AND METHOD FOR PROVIDING A SEQUENCE NUMBERING MECHANISM IN A NETWORK ENVIRONMENT

TECHNICAL FIELD

This disclosure relates in general to the field of communications and, more particularly, to providing a sequence numbering mechanism in a network environment.

BACKGROUND

Networking architectures have grown increasingly complex in communication environments. As the subscriber base of end users increases and/or becomes mobile, proper routing and efficient management of communication sessions and data flows becomes critical. Typically, subscribers seek to access content from various locations in the network. Subscribers may be provided connectivity or services based on some type of policy or agreement that involves a service provider. The service provider relationship commonly dictates the terms under which subscribers operate in the network. In some instances, policy decisions are executed such that packets are not forwarded to their intended destination. The ability to properly manage subscriber policies and to accurately bill for data presents a significant challenge to component manufacturers, network operators, and system administrators.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving a plurality of packets associated with a flow; parsing the plurality of packets associated with the flow; executing a first quality of service decision such that a first set of packets within the plurality of packets are not forwarded to their intended destination; receiving a second set of packets, which reflects a retransmission of at least a portion of the first set of packets; executing a second quality of service decision such that the second set of packets is forwarded to their intended destination; and billing the second set of packets in response to forwarding the second set of packets. In more detailed embodiments, the method includes accessing a table in which entries are provided for particular sequence number ranges for the first set of packets. An entry in a table can be generated when the first set of packets is not forwarded to its intended destination, where the entry includes a range of sequence numbers. In more specific implementations, if the first set of packets complies with a quality of service policy, the first set of packets is forwarded to its intended destination. An entry associated with the first set of packets can be resolved in a table as a result of the second set of packets being forwarded to its intended destination.

Example Embodiments

Figure 1:
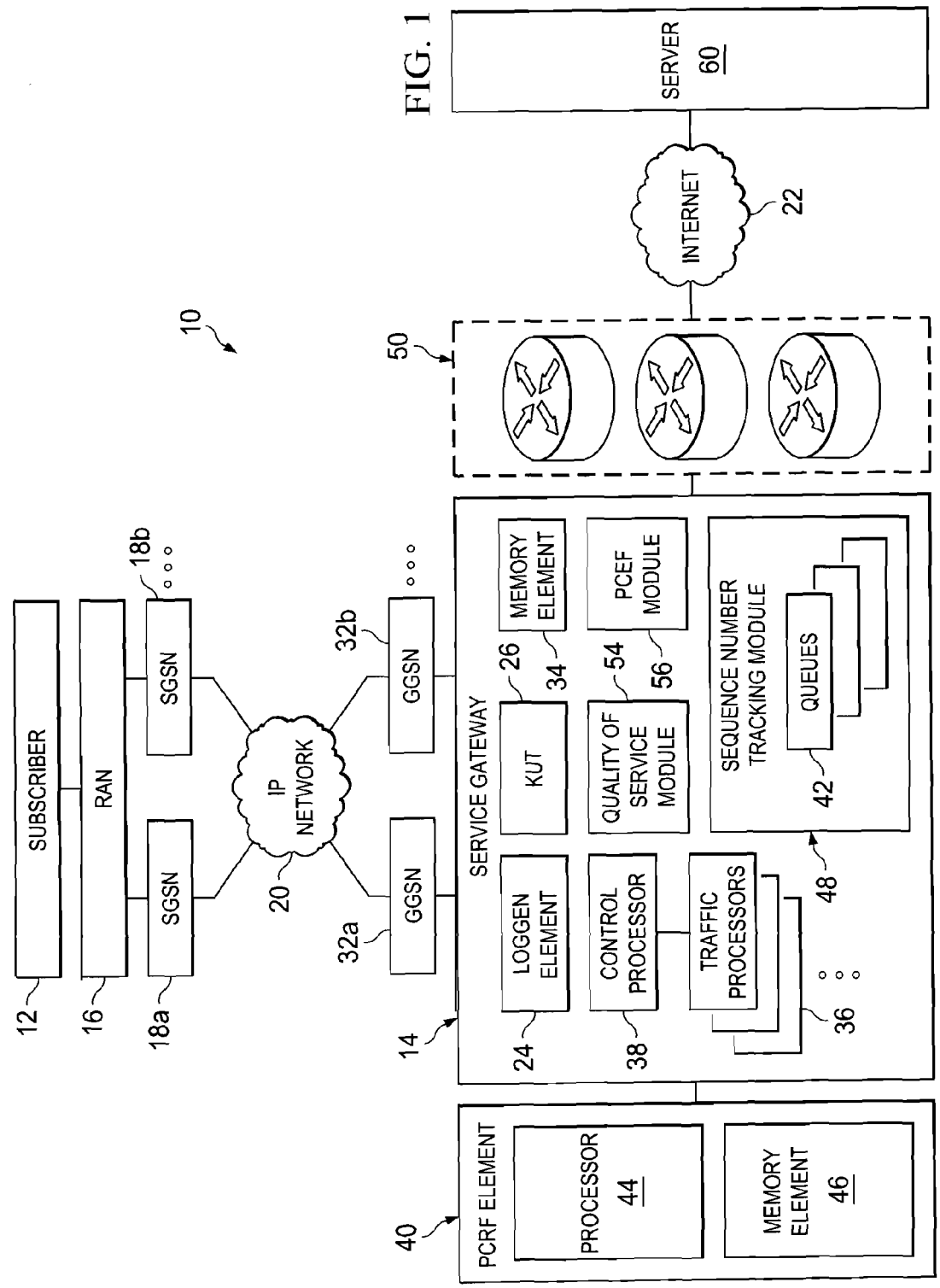
FIG. 1 is a simplified block diagram of a communication system for providing a sequence numbering mechanism in a network environment in accordance with one embodiment of the present disclosure.

Turning to FIG. 1, FIG. 1 is a simplified block diagram of a communication system 10 for providing a sequence numbering mechanism in a network environment. FIG. 1 may include a subscriber 12, a service gateway 14, a radio access network (RAN) 16, multiple serving general packet radio service (GPRS) support nodes (SGSNs) 18a and 18b, and an Internet protocol (IP) network 20. Additionally, communication system 10 may include multiple gateway GPRS support nodes (GGSNs) 32a and 32b. In addition, service gateway 14 may include a loggen element 24, a known user table (KUT) 26, and multiple traffic processors 36, which have a logical connection to a control processor 38. Service gateway 14 may additionally include a sequence number tracking module 48 (that can include a number of queues 42), a quality of service (QoS) module 54, a policy control enforcement function (PCEF) module 56, and a memory element 34. Communication system 10 may also include a policy and charging rules function (PCRF) element 40, which includes a processor 44, and a memory element 46. Additionally, communication system 10 includes a server 60, which may provide content or services sought by subscriber 12. Additionally, communication system 10 may include multiple inline service nodes (ISNs) 50, which have a logical connection to an Internet 22. In this particular instance, each ISN 50 is part of respective network paths directed toward server 60. Server 60 can be a web server responsible for traffic destined for various hostnames (e.g., having various uniform resource locators (URLs)) such as Google.com, Yahoo.com, ESPN.com, etc.

Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol where appropriate and based on particular needs. Communication system 10 may be generally configured or arranged to represent a 2G, a 2.5G, or a 3G communication architecture applicable to a Global System for Mobile (GSM) environment in accordance with a particular embodiment of the present disclosure. Communication system 10 may also be configured to operate with any version of any suitable GPRS tunneling protocol.

For purposes of illustrating certain example techniques of communication system 10, it is important to understand the communications that may be traversing the network. The following foundational information may be viewed as a basis from which the present disclosure may be properly explained. Typically, a given subscriber is allocated a certain quality of service. This quality of service can include a certain data or transmission rate, which should not be exceeded. Service gateway 14 can tabulate, or otherwise track the amount of bytes propagating for particular clients. A simple example may include the ability to rate limit (i.e., police) the amount of peer-to-peer traffic (e.g., bit-torrent downloads) propagating through service gateway 14. Another example could involve rate limiting the traffic to and from a specific subscriber. In some instances, bytes may be dropped if a certain rate threshold has been exceeded (i.e., the QoS level has been reached, surpassed, etc.).

In certain cases, the packets that are dropped may ultimately be resent or retransmitted such that service gateway 14 would see the same packet multiple times. Any dropping of TCP packets can lead to under-reporting of TCP bytes in the call detail records (CDRs). QoS is typically invoked after the packet is processed through a session services state machine, which advances the sequence numbers accordingly. Session services commonly do not count retransmissions. Thus, if the original transmission were not counted/charged by the protocol handler, then it would theoretically not ever be counted/charged. The session services state machine can track the data that is parsed by the protocol handlers (e.g., using a cur_position variable). QoS dropping can occur after the protocol handlers have parsed the data and the cur_position cannot be rewound (typically because this activity can lead to the retransmission being parsed a second time, which is not desirable). The objective in all billing scenarios is to charge appropriately (i.e., do not overcharge, do not under-charge, do not perform redundant charging, etc.), along with inspecting packets economically (i.e., inspecting packets a single time and subsequently using that gathered information).

Communication system 10 can resolve these coordination issues (and others) by configuring service gateway 14 to allow post-parsed packets to be sent, while maintaining accurate byte counts. Service gateway 14 is configured to identify previously received packets and, further, to avoid unnecessarily parsing (i.e., inspecting) the same packet repeatedly. Service gateway 14 is configured to keep track of particular points in a communication flow that have been previously inspected. In specific examples, service gateway 14 is configured to keep track of state information associated with individual packets for a communication flow. This tracking can allow service gateway 14 to recognize when a certain packet is being received a second time. In addition, this enhanced knowledge can allow for appropriate billing for specific packets propagating through service gateway 14. In a general sense, service gateway 14 effectively decouples parse state and charge state within specific flows. This increased granularity can apply to specific packets associated with a flow. This sequence number tracking protocol stands in contrast to crude forms of billing in which any packet that is parsed is immediately billed, even in instances where forwarding of the packet did not occur. In essence, service gateway 14 can bill accurately, while minimizing inspection activities associated with flows that have been previously evaluated.

In operation of a brief example flow, an entry can be generated in a table (e.g., queues 42) when packets are dropped at service gateway 14. The entry can include sequence number ranges. In one example, the entry includes the beginning and the end of a sequence number range. When previously parsed packets are received at service gateway 14, a lookup can be performed to search for the sequence numbers of the current packet. If those sequence numbers are found (i.e., a match), and if the QoS authorizes the forwarding of the packets, packets can be forwarded and billed accordingly. In addition, this entry can be removed from queues 42 (or otherwise resolved in some manner).

Note that once resolved, if for whatever reason a subsequent packet is received at service gateway 14 (e.g., in any retransmission context), then another lookup would be performed. In this example, because the subsequent packet includes sequence numbers that have already been removed (i.e., as entries in queues 42), that lookup would fail because those sequence numbers have already been forwarded and charged. The packet can be treated as a retransmission and, therefore, not counted twice for billing purposes. Some of these possible packet flows are discussed below and, further, are illustrated in an example set of configurations depicted in FIGS. 3A-C. Before turning to some of the operations of these arrangements, a brief discussion is provided about some of the possible infrastructure of FIG. 1.

Subscriber 12 can be associated with clients, customers, or end users wishing to initiate a communication in communication system 10 via some network. The term 'subscriber' is inclusive of devices used to initiate a communication, such as a computer, a personal digital assistant (PDA), a laptop or electronic notebook, a cellular telephone, an iPhone, an IP phone, or any other device, component, element, or object capable of initiating voice, audio, video, media, or data exchanges within communication system 10. Subscriber 12 may also be inclusive of a suitable interface to the human user, such as a microphone, a display, or a keyboard or other terminal equipment. Subscriber 12 may also be any device that seeks to initiate a communication on behalf of another entity or element, such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

Service gateway 14 and PCRF element 40 are network elements that facilitate service flows between endpoints and a given network (e.g., for networks such as those illustrated in FIG. 1). As used herein in this Specification, the term 'network element' is meant to encompass routers, switches, gateways, bridges, loadbalancers, firewalls, inline service nodes, proxies, servers, processors, modules, or any other suitable device, component, element, or object operable to exchange information in a network environment. This network element may include sequence number tracking module 48 to support the activities related to sequence number tracking for particular flows, as outlined herein. Moreover, the network element may include any suitable hardware, software, components, modules, interfaces, or objects that facilitate the operations thereof. This may be inclusive of appropriate algorithms and communication protocols that allow for the effective exchange of data or information.

In one implementation, service gateway 14 includes software to achieve (or to foster) the sequence number tracking operations, as outlined herein in this Specification. Note that in one example, this network element can have an internal structure (e.g., a processor, a memory element, etc.) to facilitate some of the operations described herein. In other embodiments, these sequence numbering features may be provided externally to these elements or included in some other network element to achieve this intended functionality. Alternatively, service gateway 14 may include this software (or reciprocating software) that can coordinate with other network elements in order to achieve the operations, as outlined herein. In still other embodiments, one or several devices may include any suitable algorithms, hardware, software, components, modules, interfaces, or objects that facilitate the operations thereof.

In a Gx-enabled network, service gateway 14 can act as a PCEF, either as part of an enhanced GGSN (eGGSN) node, where service gateway 14 and a GGSN are provided as separate cards in a given network element. Alternatively, service gateway 14 can be configured to operate as a standalone Gi-node, with interoperability from external GGSNs. In eGGSN mode, service gateway 14 can act as a Gx interface endpoint, while the GGSN manages packet data protocol (PDP) contexts. Service gateway 14 and a given GGSN can communicate with each other using a remote authentication dial in user service (RADIUS) protocol, or any other suitable protocol where appropriate. Other protocols to be used in such communications can include Diameter, service gateway interface (SGI), terminal access controller access-control system (TACACS), TACACS+, etc.

Service gateway 14 can offer basic Gx support with enhancements for per-user layer 7 rules, dynamic policy loading, and per-user service policies. In a Gi-node mode, a standalone service gateway 14 can act as a Gx interface endpoint. The Gi-node mode can support the same functions as the eGGSN mode. To enable Gx support for a particular subscriber, service gateway 14 can define a user profile and associate that profile with the subscriber. For example, the user profile can enable Gx for associated subscribers. The user profile can also define the actions that service gateway 14 can take if a PCRF fails. In addition, the user profile can define the mobile policy control and charging (MPCC) profile to be used by service gateway 14 when sending per-user credit control requests (CCRs) to PCRF element 40.

Service gateway 14 can determine that a user is a Gx user in several ways. For example, a given GGSN can send a RADIUS accounting start request or a RADIUS accounting interim request: both of which can indicate that the user is a Gx user. Alternatively, service gateway 14 can compare the access point name (APN) name in an attribute (e.g., a Called-Station-Id attribute) of the RADIUS accounting start against a configured list of APN names to determine that the user is a Gx user. In regards to dynamic loading of policies, service gateway 14 can dynamically load global contents, maps, policies, billing plans, and services from PCRF element 40. If configured to do so, service gateway 14 can dynamically load policies as it boots up (i.e. preloading of policies). Service gateway 14 also supports exporting the IP and TCP headers from a subscriber TCP SYN (or SYN-ACK) packet to PCRF element 40 via the Gx protocol.

RAN 16 is a communication interface between subscriber 12 and SGSNs 18a and 18b. RAN 16 may comprise a base transceiver station and a base station controller in one embodiment. The communication interface provided by RAN 16 may allow data to be exchanged between subscriber 12 and any number of selected elements within communication system 10. RAN 16 may facilitate the delivery of a request packet generated by subscriber 12 and the reception of information sought by subscriber 12. RAN 16 is only one example of a communication interface between subscriber 12 and SGSNs 18a and 18b. Other suitable types of communication interfaces may be used for any appropriate network design and these may be based on specific communication architectures.

SGSNs 18a, 18b, and GGSNs 32a, 32b are communication nodes or elements that cooperate in order to facilitate a communication session involving subscriber 12. GGSNs 32a-b are communication nodes operating in a GPRS environment that may be working in conjunction with multiple SGSNs 18a and 18b to provide a communication medium in a GPRS service network. GGSNs 32a and 32b can provide a GPRS tunneling protocol (GTP), any PDP authentication, authorization, and accounting (AAA) operations, and QoS RAN signaling. GPRS may support multiple internet communication protocols and may enable existing IP, point-to-point protocol (PPP), or any other suitable applications or platforms to operate over a given network.

IP network 20 represents a series of points or nodes of interconnected communication paths for receiving and transmitting packets of information that propagate through communication system 10. IP network 20 offers a communicative interface between subscriber 12 and selected GGSNs 32a-b, and may be any local area network (LAN), wireless local area network (WLAN), metropolitan area network (MAN), Intranet, Extranet, wide area network (WAN), virtual private network (VPN), or any other appropriate architecture or system that facilitates communications in a network environment. IP network 20 may implement a UDP/IP connection and use a TCP/IP communication language protocol in particular embodiments of the present disclosure. However, IP network 20 may alternatively implement any other suitable communication protocol for transmitting and receiving data packets within communication system 10. Internet 22 offers a communicative interface between server 60 and ISNs 50. Internet 22 may foster any communications involving services, content, video, voice, or data more generally, as it is exchanged between subscriber 12 and various network elements.

PCRF element 40 can be configured to act as a Diameter server and perform the following functions: 1) use the Gx interface to provision PCC rules to (and remove PCC rules from) PCEF module 56; 2) manage policy control decisions; 3) provide network control regarding the service data flow detection, QoS, and flow-based charging towards PCEF module 56; 4) receive session and media-related information from application functions (AFs); and 5) inform the AFs of traffic plane events.

PCEF module 56 can act as a Diameter client and perform the following functions: 1) use the Gx interface to send traffic plane events to PCRF element 40; 2) enforce policy, handle flow-based charging, control QoS and the handling of user plane traffic; 3) provide service data flow detection, counting for online and offline charging interactions; and 4) report changes in the status of service data flows. In a Gx-enabled network, the PCC rules can be used to: 1) detect a packet that belongs to a service data flow; 2) identify the service to which the service data flow contributes; and 3) provide applicable charging parameters and policy control for a service data flow. PCC rules can be dynamically provisioned by PCRF element 40 to PCEF module 56 over the Gx interface. Dynamic PCC rules can be dynamically generated in PCRF element 40. Dynamic PCC rules can be activated, modified, and deactivated at any time.

Loggen element 24 is a storage element operable to build billing records and communicate the billing records to a billing system based on information provided by KUT 26. Loggen element 24 may also operate to store data for later use and execute all formatting for billing records to be communicated to a billing system. Loggen element 24 may be implemented using hardware, software, or any other suitable element or object operable to store information and to generate a billing record to be communicated to a billing system. Loggen element 24 may generate logging records or billing records and additionally send messages to a billing system element associated with a change in SGSN.

KUT 26 is a data storage element that manages one or more correlations between the ID of subscriber 12 and a corresponding IP address. KUT 26 could be simply part of any memory element within service gateway 14. KUT 26 may also store information relating to billing, previously designated for subscriber 12, and the billing system may be invoked when additional information associated with subscriber 12 is communicated to service gateway 14. KUT 26 may be consulted as additional billing records are created in order to determine that a billing system should receive selected billing records. KUT 26 may also include an application program interface (API) that may be implemented in order to obtain user ID information for an IP address from a data flow.

KUT 26 is provided with the capability of mapping the source IP address (or any other subscriber 12 parameter) to a user ID. The user ID may be obtained from an external database, where appropriate, or any other suitable location. Alternatively, the user ID may be extracted from a RADIUS flow, a TACACS communication flow, a Diameter communication flow, or any other suitable communication protocol flow, communication session, or data exchange. The database may be populated at any suitable time and updated using any suitable mechanism, such as via the sniffing of RADIUS or TACACS flows.

Inline service nodes (ISNs) 50 represent different types of network elements (e.g., routers, switches, gateways, etc.) that can offer various services and capabilities for subscriber 12. Thus, particular ISNs can offer different services for incoming flows. For example, one ISN may be associated with video compression such that any flow associated with this particular technology or protocol would be routed to that ISN. Another ISN may be tasked with content filtering operations, while still another ISN may be associated with voice data associated with a VPN connection. Thus, in changing the path for a particular communication flow, the packets can be processed or implicated differently depending on which ISN is processing the particular flow. In one example, there is a default route associated with particular web servers, and this particular default could be the shortest path between two network points. In another example, particular routing decisions are executed such that particular flows are directed to specific paths that can accommodate specific subscriber needs. In one example, ISNs 50 may not be simple routers in a more traditional sense. ISNs 50 can be more complex service nodes operating on network flows at much higher levels, rather than providing simple routing and forwarding operations. For example, these nodes may implement specialized inline services such as image and video optimization, wireless TCP optimizations, protocol transformations (WAP/HTTP), content filtering controls, etc.

Quality of service module 54 is configured to execute quality of service decisions for particular subscribers. This may include referencing or accessing a given profile for particular subscribers. Additionally, quality of service module 54 can interface with PCEF module 56 in order to render or to execute quality of service decisions. Quality of service module 54 can also interface with sequence number tracking module 48 in order to properly track the forwarding and/or billing activities for particular packets.

Turning to additional details associated with particular QoS activities of communication system 10, QoS actions (e.g., to be performed by quality of service module 54) can be specified by configuring a QoS profile for each particular subscriber. Such a profile can be stored within service gateway 14, provided in a table external to service gateway 14, provided in a database, or otherwise suitably stored, maintained, cached, or referenced in order to execute quality of service decisions. The profile can be attached to a billing plan (per-user) and/or a service (per-user service). The QoS profile configuration can describe the various parameters for policing and marking traffic. Traffic actions can include taking no action, marking Differentiated Services Code Point (DSCP) bits, dropping the traffic, etc. Note that service gateway 14 can be employed on a per-user basis, or on a per-user service. The per-user basis implies that the QoS is applied to traffic to/from a particular subscriber. The per-user service implies that the QoS can be applied to traffic to/from a particular subscriber and that also matches a specific service. Stated differently, the QoS can be applied to each service instance in certain examples.

In one example, a token bucket can be used as a formal definition of a rate of transfer. The token bucket can have three components: a burst size, a mean rate, and a time interval (Tc). Although the mean rate is generally represented as bits per second, any two values may be derived from the third by the relation shown as follows: mean rate=burst size/time interval. Several parameters can control the operation of policing the token bucket, including: 1) the mean rate, which is also called the committed information rate (CIR) [this specifies how much data can be sent or forwarded per unit time on average]; 2) the time interval, which is also called the measurement interval [this specifies the time quantum in seconds per burst]; and 3) the burst size, which is also called the Committed Burst (Bc) size [this specifies (in bytes per burst) how much traffic can be sent within a given unit of time to minimize scheduling concerns].

In one example, QoS can be applied on a per-packet basis. The entire packet can be forwarded or dropped based on the QoS decision. Note that commonly, there is no support for applying QoS on a part of a packet. This has some implications for HTTP traffic. An HTTP packet (e.g., parsed at layer 7) may span multiple transactions. For example, a packet containing multiple, pipelined "GET" requests is representative of such an instance. It is conceivable that each such transaction maps to a different service gateway 14 service and, hence, potentially to a different QoS. For such packets, the expected behavior is as follows: 1) Identify the first (oldest) transaction for which the packet has data; 2) Check if any QoS has been configured/signaled for the service used by the first transaction; 3) Check if any QoS has been configured/signaled for the particular subscriber; 4) Apply the QoS (if any) obtained in the previous two steps to the entire packet; and 5) Forward/mark/drop the entire packet based on results from the previous step. If the packet is QoS dropped, the CDR for the first transaction can reflect the dropped byte and packet count (assuming transaction CDRs are configured). The byte count can match the size of the packet.

Server 60 can be a web server offering content or services to any subscriber or any group of subscribers. For example, server 60 could be any network element associated with www.ESPN.com or www.yahoo.com: both of which could offer content for their end users. Alternatively, server 60 can be any destination, location, or node that is sought to be accessed or used by subscriber 12. Server 60 may provide the requested service/content, or provide a portal, pathway, or gateway to another location that includes the desired data. In other embodiments, server 60 could simply be a data storage location or a processor that can store or deliver content or services to one or more subscribers 12.

Figure 2:
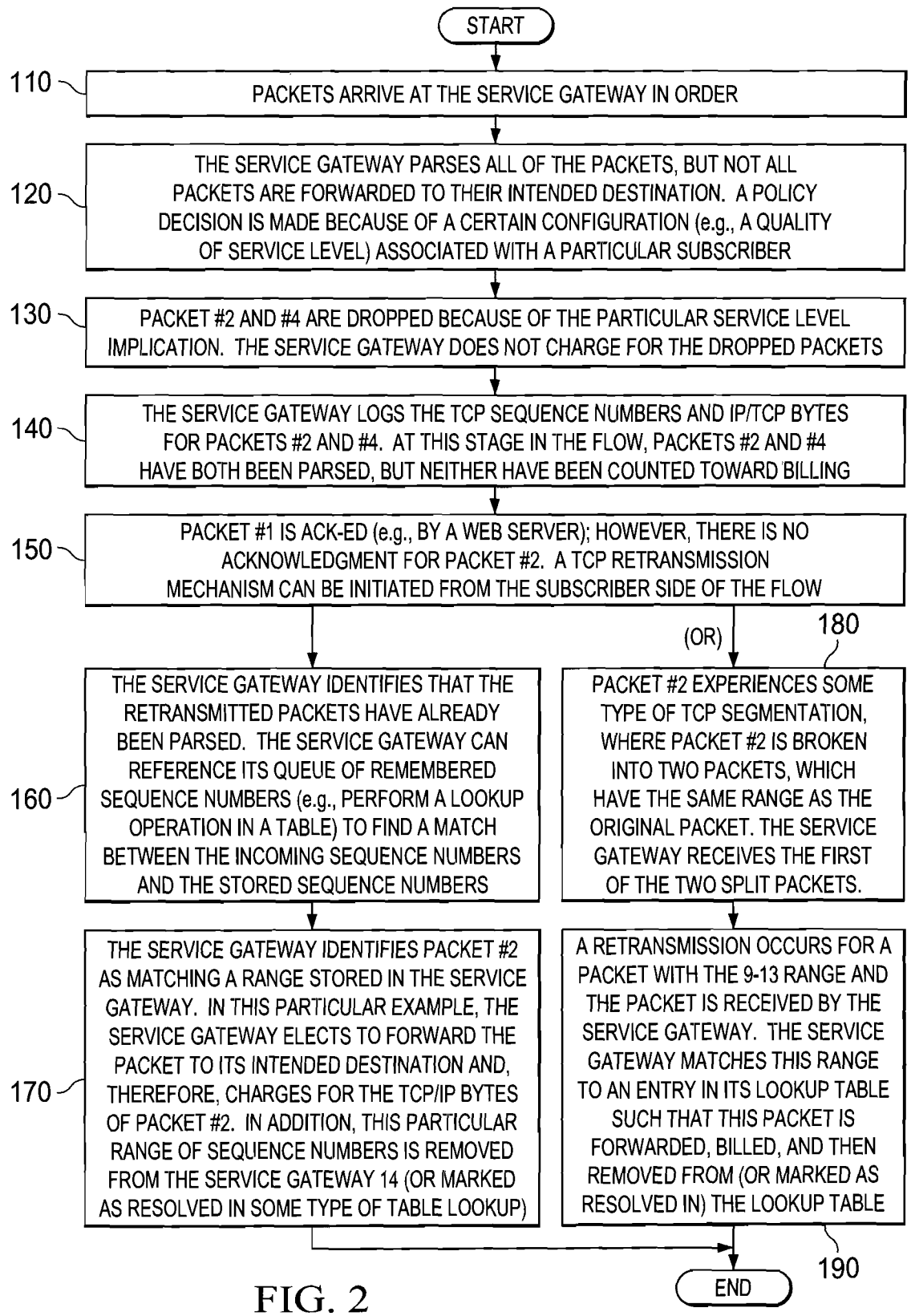
FIG. 2 is a simplified flow diagram illustrating potential operations associated with the communication system.
Figure 3A:
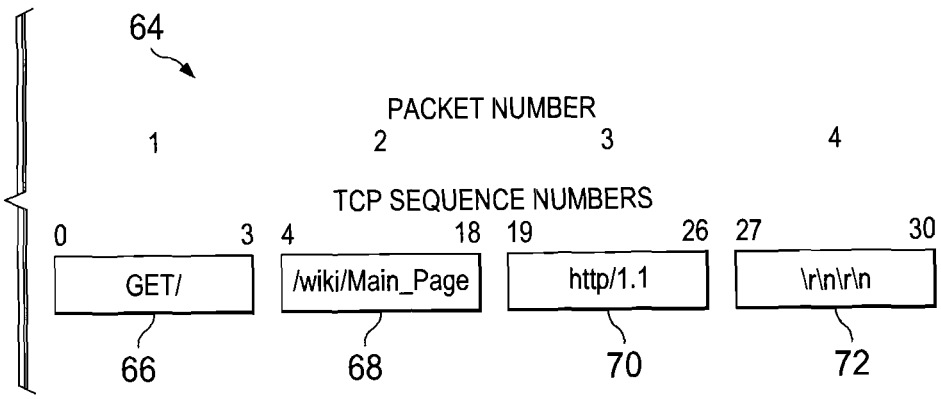
FIGS. 3A-C are simplified block diagrams illustrating packets associated with a flow propagating in the communication system.

Turning to FIG. 2, FIG. 2 is a simplified flow illustrating example steps associated with communication system 10. Note that FIG. 2 is described in conjunction with FIGS. 3A-3C, which are simplified block diagrams that depict various packets associated with sequence number tracking operations. Turning specifically to FIG. 3A, this illustration shows a flow 64 that includes multiple packets 66, 68, 70, and 72. Each packet includes a designated sequence number range, as is illustrated. In addition, each packet is numbered #1-#4. In this particular example, the flow relates to a request for content on Wikipedia.org.

Beginning at step 110, a packet arrives at service gateway 14 (e.g., on a given traffic processor 36). In this particular example, the packets arrive at service gateway 14 in order (although packets often do not arrive in proper numeric order). At step 120, service gateway 14 parses all of the packets 66, 68, 70, and 72. However, in this particular implementation, not all packets are forwarded to their intended destination. In this example, packet #1 is parsed and counted for billing purposes. After packet 68 (the 2nd packet) is parsed, a policy decision is made because of a certain configuration (e.g., a quality of service level) associated with a particular subscriber. This mapping between service levels and particular subscribers can be included in any suitable table (e.g., provided in a queue, database, cache, etc.), which can reside in (or be referenced by) sequence number tracking module 48. Note also that the parsing state associated with packet #2 is complete at this junction. For example, an internal parse state (e.g., within an internal HTTP parser of service gateway 14) is complete for packet #2. While the parsing state is complete, the packet is not counted for billing purposes because it was ultimately not forwarded.

At step 130, packet 68 and packet 72 (packets #2 and #4) are dropped because of the particular service level implication (e.g., a QoS parameter for a particular subscriber has been reached, a usage threshold has been met, a byte count has been exceeded, etc.). Service gateway 14 does not charge for the dropped packets, but a policy decision has been rendered at this point. At step 140, service gateway 14 logs the TCP sequence numbers and IP/TCP bytes for packets 68 and 72 (i.e., packets #2 and #4). At this stage in the flow, packets #2 and #4 have both been parsed, but neither has been counted toward billing.

Figure 3B:
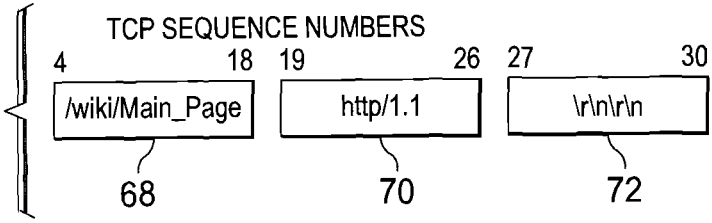

The packets of FIG. 3B continue along with this particular flow involving a request for content at Wikipedia.org. At step 150, packet #1 is ACK-ed (e.g., by a web server); however, there is no acknowledgment for packet #2. A TCP retransmission mechanism could be initiated from the subscriber side of the flow. In essence, a device on the subscriber end of this flow will begin sending the missing packet a second time. At step 160, service gateway 14 identifies that the retransmitted packets have already been parsed. Service gateway 14 can reference its queue of remembered sequence numbers (e.g., perform a lookup operation) to find a match between the incoming sequence numbers and the stored sequence numbers.

This packet does not need to be parsed a second time by service gateway 14. In essence, service gateway 14 can simply compare sequence number ranges in processing these previously received packets. Note that these packets may be dropped again based on some type of QoS parameter. At step 170, service gateway 14 identifies packet #2 as matching a range stored in service gateway 14. In this particular example, service gateway 14 elects to forward the packet to its intended destination and, therefore, charges for the TCP/IP bytes of packet #2. In addition, this particular range of sequence numbers is resolved in a table of service gateway 14. Note that as used herein in this Specification, the term 'resolve' is meant to include any type of removal, deletion, clearing, marking, or otherwise addressing a given entry that is maintained. The term 'table' is meant to include any type of cache, memory, database, etc. in which sequence number entries can be appropriately maintained for subsequent reference.

Figure 3C:
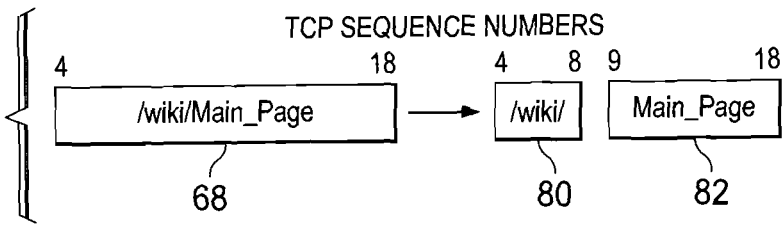

FIG. 3C continues along with this particular flow, where packets 80 and 82 represent segments of packet 68. Note that in previous discussions, packet boundaries have been truncated at convenient intervals for purposes of explanation. However, certain instances may occur in which the segmentation of packets occurs, where some portion of the packet has been billed and forwarded and other bytes of the packet have not been billed or necessarily forwarded.

At step 180, packet #2 experiences some type of TCP segmentation, where packet #2 is broken into two packets, which have the same range as the original packet 68. [Note that step 180 (below) is representative of an alternate scenario such that one scenario involves steps 110 through 170, whereas another alternate scenario is illustrated by steps 110 through 150 with the addition of steps 180 and 190.] Service gateway 14 receives the first of the two split packets (i.e., packet 80). Packet 68 may have been already parsed, but only as a single packet. Packets 80 and 82 may be dropped again because of some type of QoS parameter and in such an instance, the sequence number range would remain in some type of storage (e.g., a queue). In this instance, because the packets were indeed forwarded, the TCP sequence number range from 6-8 is removed from service gateway 14. Service gateway 14 then charges for the TCP/IP bytes of the segment. The TCP sequence number range 9-13 is maintained (as is illustrated in FIG. 3C) because the second half of the segment is either dropped, or not seen by service gateway 14. At step 190, a retransmission occurs for a packet with the 9-13 range. Service gateway 14 matches this range to an entry in its lookup table such that this packet is forwarded, billed, and then resolved in the lookup table.

Note that in certain example implementations, the sequence number tracking (and matching) functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, service gateway 14 may include software in order to achieve the sequence number tracking (and matching) functions outlined herein. These activities can be facilitated by sequence number tracking module 48. Service gateway 14 can include memory elements for storing information to be used in achieving the intelligent sequence number tracking, as outlined herein. Additionally, service gateway 14 may include a processor that can execute software or an algorithm to perform the sequence number tracking, as discussed in this Specification. This device may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, lookup table, cache, etc.) should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the preceding flow diagrams illustrate only some of the possible signaling scenarios and patterns that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain GGSN components, communication system 10 may be applicable to other protocols and arrangements such as any type of network access server (NAS), GPRS entry point, etc. Moreover, the present disclosure is equally applicable to various cellular and/or wireless technologies including CDMA, Wi-Fi, WiMax, etc. In addition, other example environments that could use the features defined herein include Pico and femto architectures, where an appropriate sequence number tracking would occur for one or more packets. Moreover, although communication system 10 has been illustrated with reference to particular elements and operations that facilitate the communication process, these elements and operations may be replaced by any suitable architecture or process that achieves the intended functionality of communication system 10.

What is claimed is:

1. A method, comprising:
   receiving a plurality of packets associated with a flow, wherein each one of the packets has associated therewith a sequence number range comprising a plurality of consecutive sequence numbers;
   parsing the plurality of packets associated with the flow;
   executing a first quality of service decision such that a first set of packets within the plurality of packets are not forwarded to the first set of packets' intended destination;
   creating an entry in a sequence number table for the first set of packets, the entry comprising a list of each of the sequence numbers comprising the sequence number ranges associated with the packets comprising the first set of packets;
   receiving a second set of packets, wherein each packet of the second set of packets has associated therewith a sequence number range comprising a plurality of consecutive sequence numbers;
   performing a lookup using the table to determine whether the sequence numbers comprising the sequence number ranges for the second set of packets overlaps with the list of sequence numbers indicated in the entry;
   if the sequence number range for the second set of packets overlaps with the list of sequence numbers indicated in the entry:
      executing a second quality of service decision such that the second set of packets is forwarded to the second set of packets' intended destination without having been reparsed;
      billing the second set of packets in response to the performing; and
      resolving the entry to remove from the list of sequence numbers indicated therein the numbers comprising the sequence number ranges for the second set of packets;
   wherein if the first set of packets comply with a quality of service policy, the first set of packets is forwarded to the first set of packets' intended destination.

2. The method of claim 1, further comprising:
   accessing the table in which entries are provided for particular sequence number ranges for the first set of packets.

3. The method of claim 1, further comprising:
   receiving a subsequent packet that is a duplicate packet of the first set of packets that has been forwarded to the first set of packets' intended destination; and
   identifying that the sequence number associated with the subsequent packet have already been resolved such that the subsequent packet is not billed.

4. The method of claim 1, further comprising:
   receiving subsequent packets that have been segmented and which were included in the plurality of packets associated with the flow; and
   identifying that at least some of the subsequent packets that have been segmented include sequence number ranges that have been resolved such that billing is not performed for the at least some of the subsequent packets that have been segmented.

5. Logic encoded in one or more non-transitory, computer-readable media that includes code for execution and when executed by a processor operable to perform operations comprising:
   receiving a plurality of packets associated with a flow, wherein each one of the packets has associated therewith a sequence number range comprising a plurality of consecutive sequence numbers;
   parsing the plurality of packets associated with the flow;
   executing a first quality of service decision such that a first set of packets within the plurality of packets are not forwarded to the first set of packets' intended destination;
   creating an entry in a sequence number table for the first set of packets, the entry comprising a list of each of the sequence numbers comprising the sequence number ranges associated with the packets comprising the first set of packets;

receiving a second set of packets, wherein each packet of the second set of packets has associated therewith a sequence number range comprising a plurality of consecutive sequence numbers;

performing a lookup using the table to determine whether the sequence numbers comprising the sequence number ranges for the second set of packets overlaps with the list of sequence numbers indicated in the entry;

if the sequence number range for the second set of packets overlaps with the list of sequence numbers indicated in the entry:

execute a second quality of service decision such that the second set of packets is forwarded to the second set of packets' intended destination without having been reparsed;

billing the second set of packets in response to the performing; and resolving the entry to remove from the list of sequence numbers indicated therein the numbers comprising the sequence number ranges for the second set of packets;

wherein if the first set of packets comply with a quality of service policy, the first set of packets is forwarded to the first set of packets' intended destination.

6. The logic of claim 5, wherein the identifying that the first set of packets were previously received includes accessing a table in which entries are provided for particular sequence number ranges for the first set of packets.

7. The logic of claim 5, the operations further comprising:
receiving a subsequent packet that is a duplicate packet of the first set of packets that has been forwarded to the first set of packets' intended destination; and
identifying that the sequence number associated with the subsequent packet have already been resolved such that the subsequent packet is not billed.

8. The logic of claim 5, the operations further comprising:
receiving subsequent packets that have been segmented and which were included in the plurality of packets associated with the flow; and
identifying that at least some of the subsequent packets that have been segmented include sequence number ranges that have been resolved such that they are not billed.

9. An apparatus, comprising:
a memory element configured to store data,
a processor configured to execute instructions associated with the data, and
a tracking module configured to:
receive a plurality of packets associated with a flow, wherein each one of the packets has associated therewith a sequence number range comprising a plurality of consecutive sequence numbers;
parse the plurality of packets associated with the flow;
execute a first quality of service decision such that a first set of packets within the plurality of packets are not forwarded to the first set of packets' intended destination;

create an entry in a sequence number table for the first set of packets, the entry comprising a list of each of the sequence numbers comprising the sequence number ranges associated with the packets comprising the first set of packets;

receive a second set of packets, wherein each packet of the second set of packets has associated therewith a sequence number range comprising a plurality of consecutive sequence numbers;

perform a lookup using the table to determine whether the sequence numbers comprising the sequence number ranges for the second set of packets overlaps with the list of sequence numbers indicated in the entry;

if the sequence number range for the second set of packets overlaps with the list of sequence numbers indicated in the entry:

execute a second quality of service decision such that the second set of packets is forwarded to the second set of packets' intended destination without having been reparsed;

bill the second set of packets in response to the performing; and resolving the entry to remove from the list of sequence numbers indicated therein the numbers comprising the sequence number ranges for the second set of packets;

wherein if the first set of packets comply with a quality of service policy, the first set of packets is forwarded to the first set of packets' intended destination.

10. The apparatus of claim 9, wherein the tracking module is further configured to:
access a table in which entries are provided for particular sequence number ranges for the first set of packets.

11. The apparatus of claim 9, further comprising:
a policy control enforcement function (PCEF) module configured to render policy decisions associated with the flow.

12. The apparatus of claim 9, further comprising:
a quality of service module configured to manage a quality of service level for the flow.

13. The apparatus of claim 9, wherein if the first set of packets comply with a quality of service policy, the first set of packets is forwarded to the first set of packets' intended destination, and wherein an entry associated with the first set of packets is resolved in the table as a result of the second set of packets being forwarded to the second set of packets' intended destination.

14. The apparatus of claim 9, wherein the tracking module is further configured to:
receive subsequent packets that have been segmented and which were included in the plurality of packets associated with the flow; and
identify that at least some of the subsequent packets that have been segmented include sequence number ranges that have been resolved such that they are not billed.

* * * * *